May 18, 1965 H. M. WATSON ETAL 3,184,111
APPARATUS FOR USE IN FILTRATION OF CONTAMINATED FLUIDS
Filed March 21, 1961 5 Sheets-Sheet 1
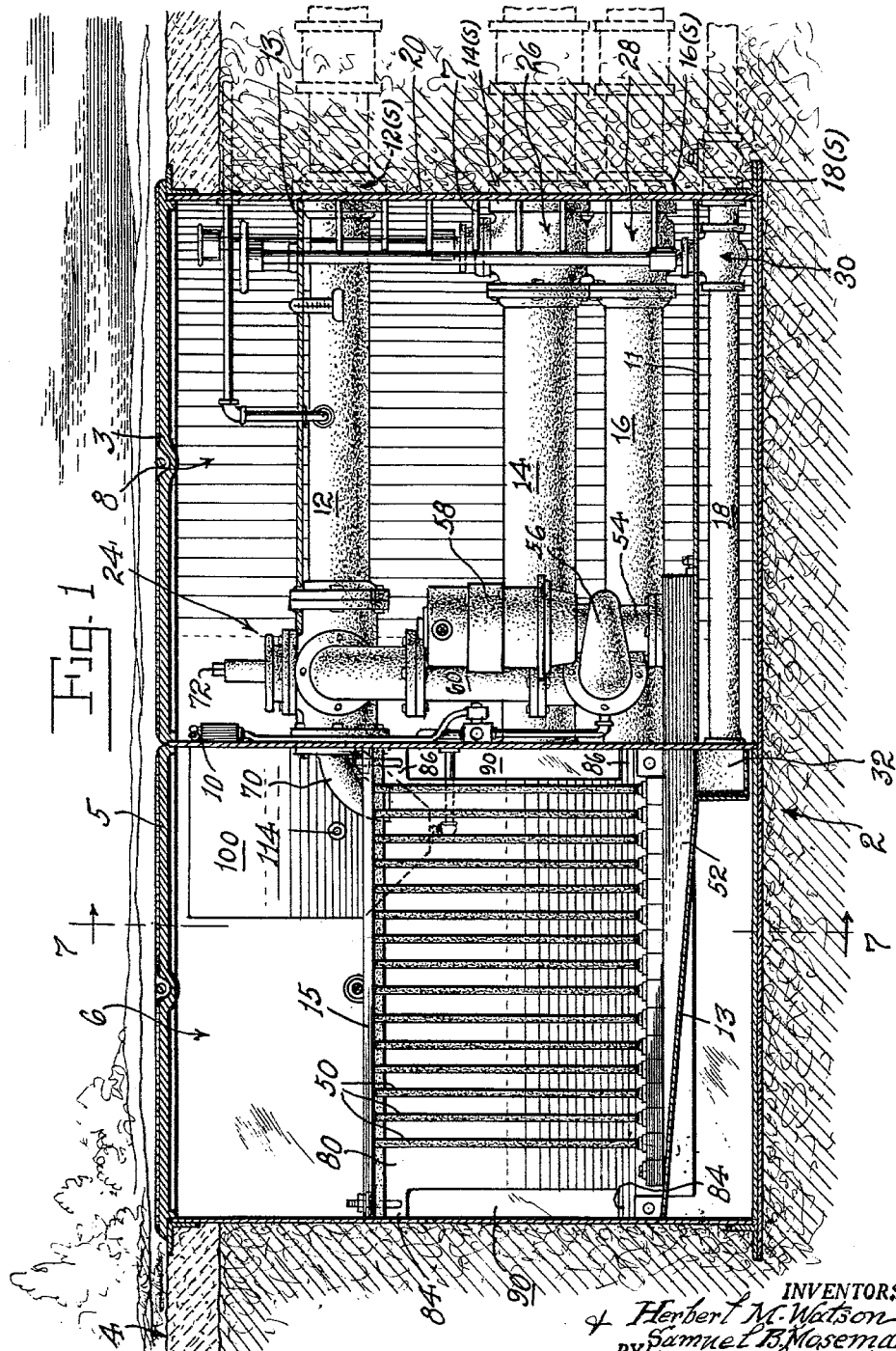
INVENTORS
Herbert M. Watson
Samuel B. Maseman
BY Jacobi & Jacobi
ATTORNEYS

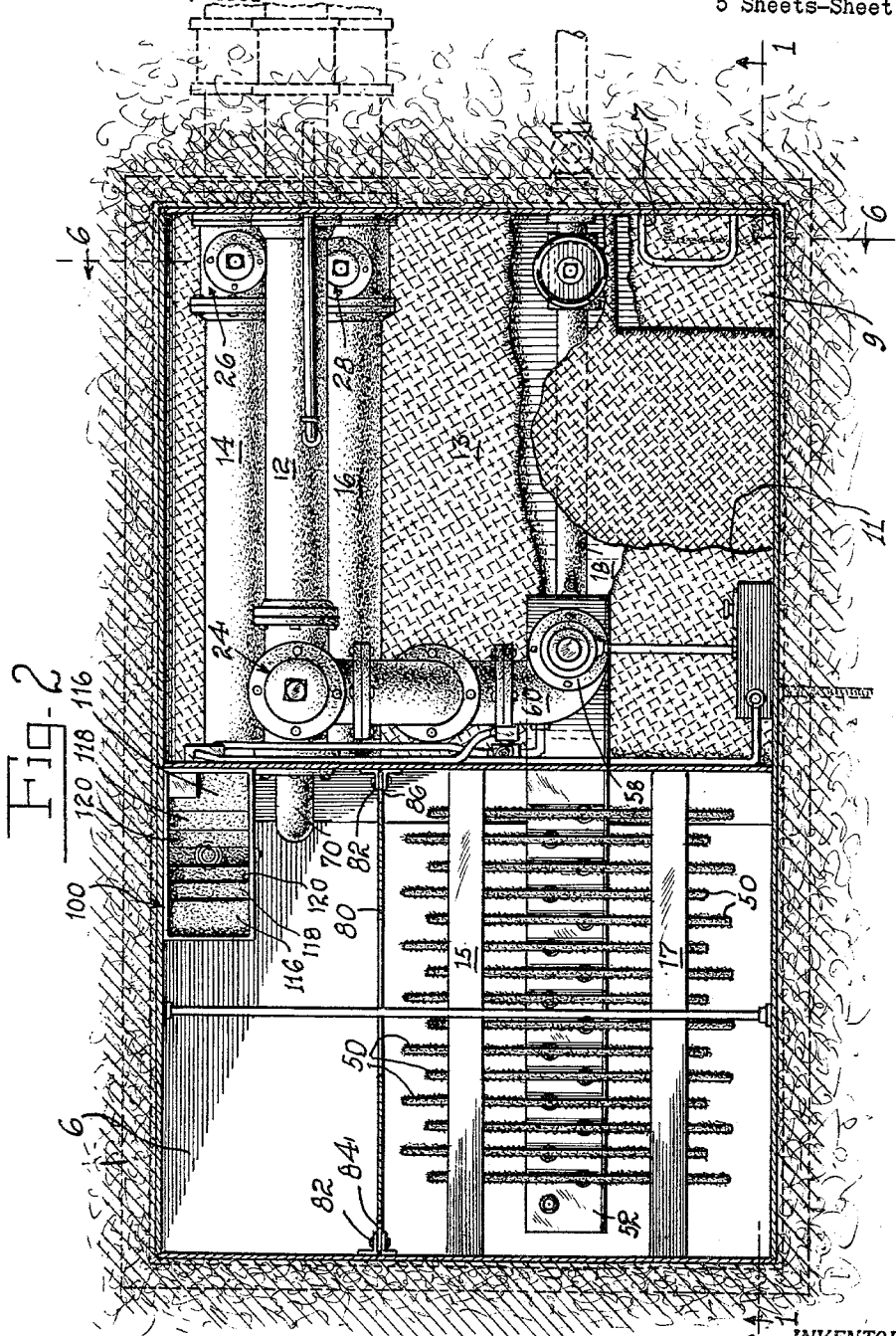

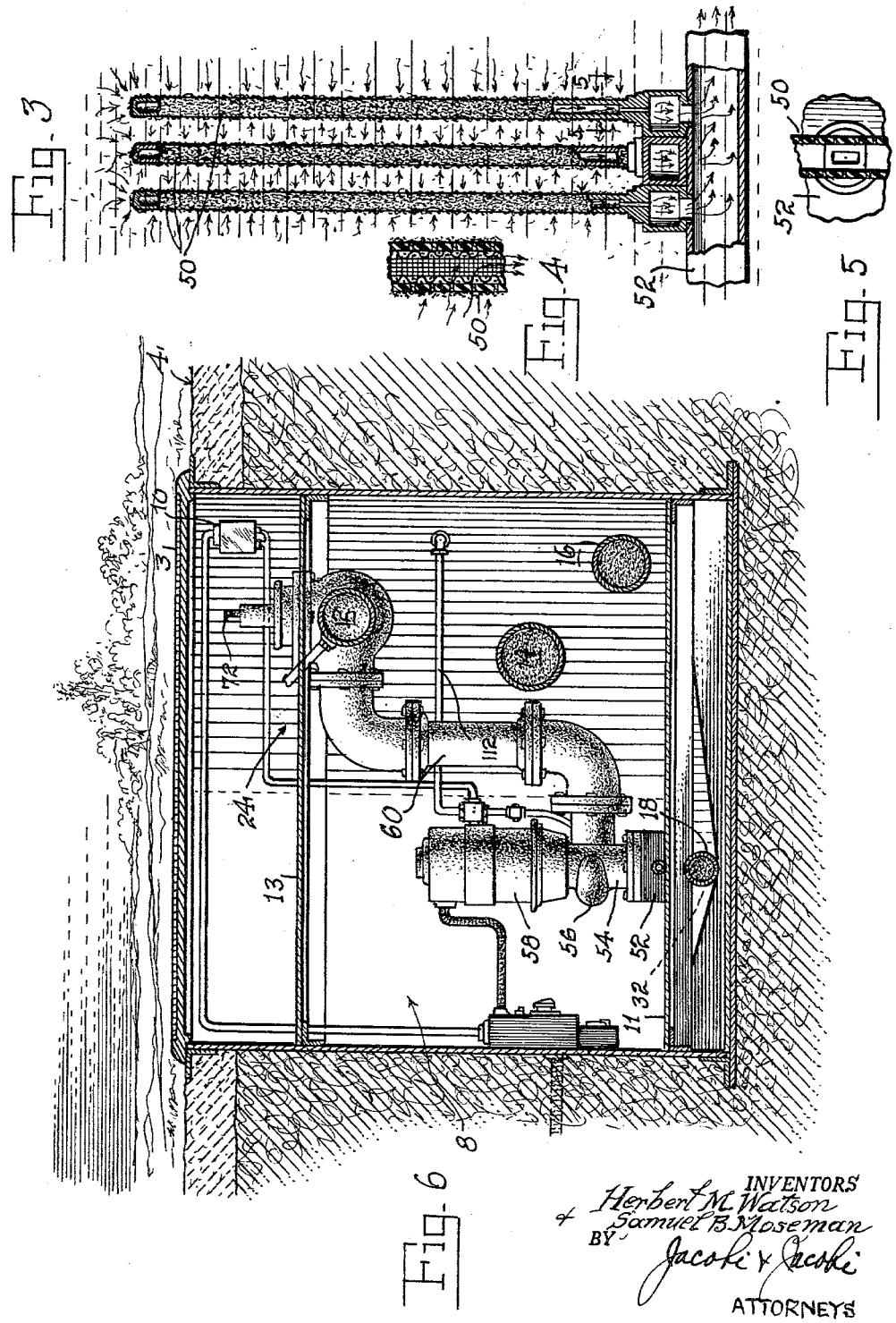

May 18, 1965
H. M. WATSON ETAL
3,184,111
APPARATUS FOR USE IN FILTRATION OF CONTAMINATED FLUIDS
Filed March 21, 1961
5 Sheets-Sheet 4
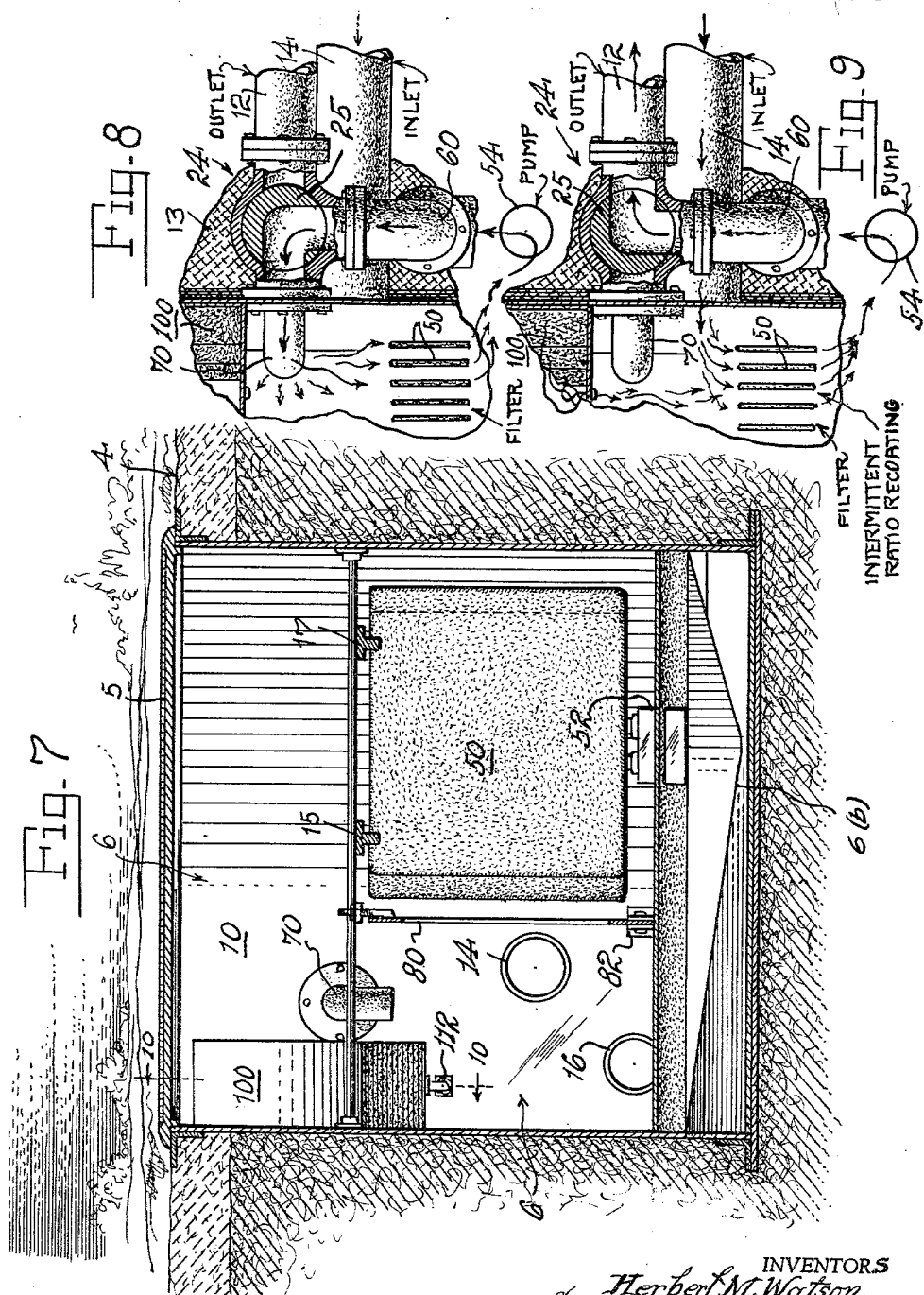
INVENTORS
Herbert M. Watson
Samuel B. Moseman
BY Jacobi & Jacobi
ATTORNEYS.

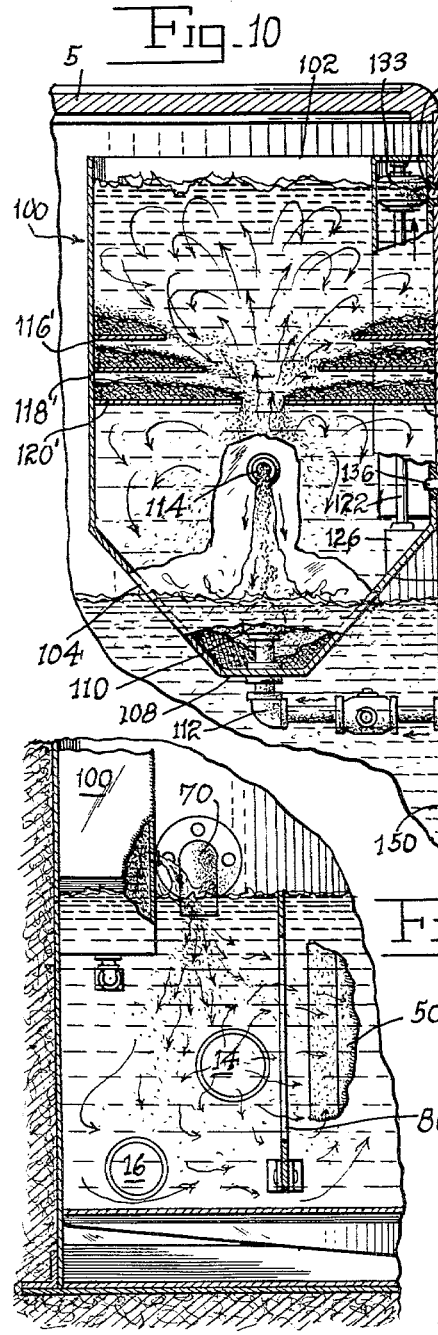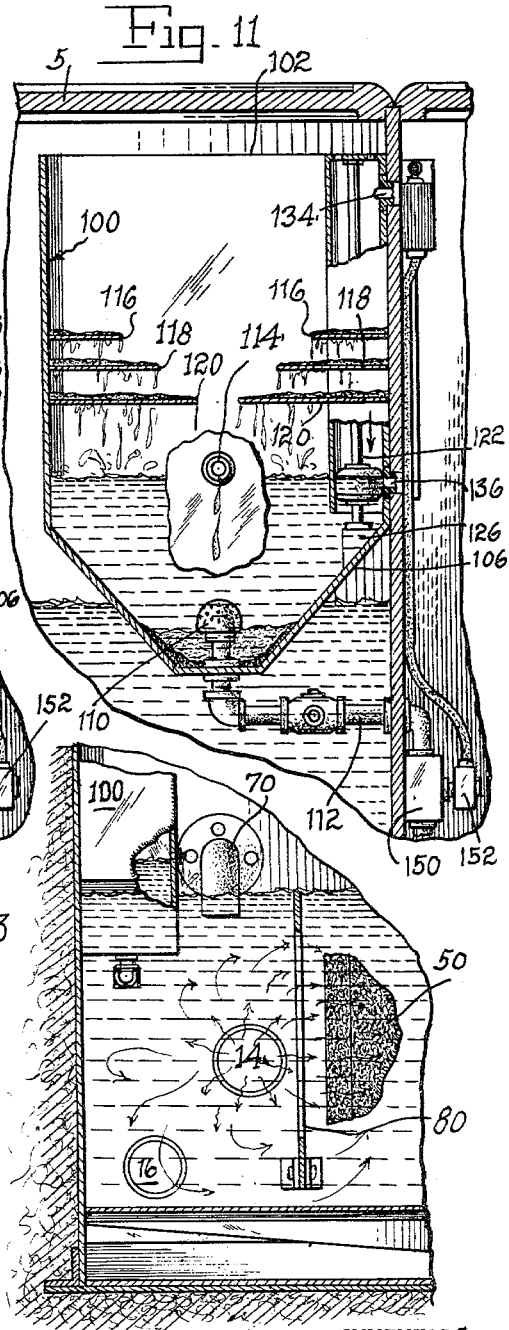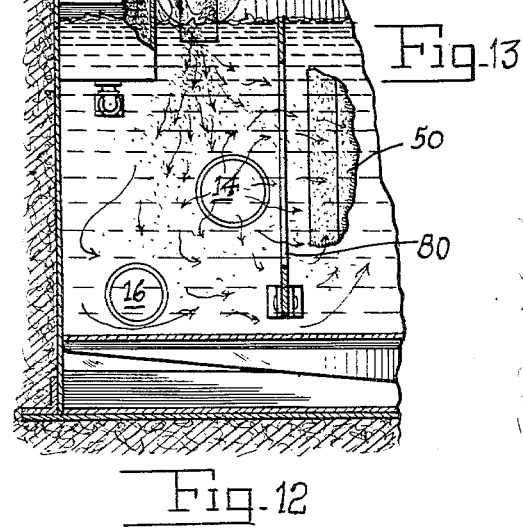

3,184,111
APPARATUS FOR USE IN FILTRATION OF CONTAMINATED FLUIDS
Herbert M. Watson and Samuel B. Moseman, both of 2311 N. Front St., Harrisburg, Pa.
Filed Mar. 21, 1961, Ser. No. 97,221
5 Claims. (Cl. 222—133)

This invention relates to improvements in filter systems, and more particularly to an apparatus used in systems adapted to filter fluid such as drinking water, swimming pool water or the like.

Various types of filter units adapted to operate on contaminated fluid to extract therefrom the contamination have heretofore been suggested. In their basic aspects, the prior systems may be classified into two groups, one group of systems incorporating a vacuum type pressure to draw fluid to be filtered through filter elements, and the other group of systems operating to push fluid to be filtered through filter elements. The present invention finds particular utility when applied to the first of the aforesaid types of prior systems.

In such type system, in some instances filter elements are provided through which the contaminated fluid is to pass, and, on the surfaces of which elements, particulate material is easily supported. In operating with vacuum systems utilizing filter elements adapted to support particulate material, a suitable filtering composition such as diatomaceous earth is dumped, or otherwise placed, in fluid passing through the filter elements whereby, as the filtering takes place and the fluid passes through the elements, the particulate material composition is deposited on the surface of the elements. While this type process provides for certain advantages over other types of filtering methods, users of prior vacuum type-particulate material installations face certain problems. More particularly, as operation proceeds for a short period of time the particulate material becomes contaminated and its effectiveness decreases. Thus, it is necessary to periodically add particulate material to the fluid passing through the system to maintain efficiency of decontamination.

In order to eliminate the necessity for manually adding particulate material from time to time, and the disadvantages resulting from manual operation, it has been suggested previously that a separate storage chamber be used for the particulate material which would automatically periodically dispense fresh material. Merely dumping some dry particulate material in a particular location within the main filter tank through which liquid is passing does not result in satisfactory operation because no uniformity of concentration is achieved, and thus the prevailing idea is to make some sort of slurry containing the particulate material, and then add the slurry to fluid passing through the system.

To obtain the slurry, previous suggestions have provided for passing some liquid, either from the body of liquid circulating through the system or from an independent source, into a separate mixing chamber containing particulate material. After a mixture or slurry is formed in the separate chamber, the same is dispensed into the main filter tank.

However, in the prior mixing tanks it was necessary to introduce fluid into the separate chamber under considerable pressure in order to obtain a slurry with some concentration of material. This resulted initially in formation of a slurry having an over-concentration of particulate material, and moreover rapid depletion of the material supply. In other words, prior separate chamber systems, when operated intermittently so as to form a slurry and mix the same with fluid passing through the system, used initially, during the first few slurry forming operation, almost all of the particulate material. In actual practice, the result of attempting to achieve an automatic periodic "slurry adding" by separate chamber mixing was the exhaustion of stored particulate material within approximately twenty minutes of operation. Although the separate chamber systems had an advantage in eliminating moving parts, they were not satisfactory, and other types of particulate material supplies were also used, such as, for example, dry blade type feeders adapted to dispense particulate material slowly, and mixing tanks operating with diaphragm pumps to dispense slurry. Both of these types of supplies, however, require moving parts and somewhat elaborate equipment and are undesirable from an expense standpoint as well as because their operation is subject to mechanical failure.

Thus, while various types of periodic particulate material dispensers or supplies have heretofore been suggested for use in depositing fresh particulate material on the surfaces of filter elements in filtering systems, no prior suggestion has proved to be completely satisfactory.

Accordingly, the present invention has as its primary object the provision of an apparatus for filtering contaminated liquid which are not subject to the aforesaid disadvantages. More specifically, a primary object of the present invention is to provide a filtering apparatus serving to periodically add particulate material to fluids circulating through a filter chamber having filter elements therein adapted to support particulate material on the surfaces thereof, which apparatus provide for intermittently dispersing particulate material in a slurry, and draining the slurry into the path of fluid passing through the system whereby no moving mechanical means are required, and whereby a storage supply of particulate material is substantially uniformly dispersed with continued periodic operation, and not rapidly depleted.

Yet another and still further object of the present invention is to provide in a filter system apparatus an improved form of "slurry forming and adding chamber" which uses the inherent properties of particulate material such as diatomaceous earth for obtaining uniformity of concentration, and which accordingly is provided with an open liquid passageway preferably having baffles on either side thereof adapted to support particulate material and define a convergent or restricted fluid path in the direction of the outlet from the chamber.

Still other, further and more specific objects of the present invention are (a) to provide a filter system in accordance with the preceding objects which is adapted to initially deposit particulate material on the filter element surface by means of circulating available fluid through the filter chamber; (b) to provide an apparatus conforming with the preceding pertinent objects which incorporates a separate slurry forming chamber having a spray head inlet and a plurality of baffles disposed thereabove for supporting particulate material vertically above the spray head, and defining a constricted fluid path within such chamber; (c) to provide an apparatus as prescribed above wherein the supply of fluid to the slurry forming chamber is controlled by an automatically operated valve means responsive to the level of liquid within the slurry forming chamber; (d) to provide a filter system incorporating the improvements referred to hereinabove, and other means cooperating therewith to allow for emptying the system components completely, and drain scum from the surface of any fluid supply such as a swimming pool, and at the same time providing efficient and prolonged filtration of fluid; (e) to provide such a filter system which is operated by using diatomaceous earth as the particulate material; and (f) to provide an apparatus conforming with all of the preceding objects which are adapted to be carried out in, or installed on existing equipment with only slight or no modification thereto.

The invention lies in the construction and combination of the various system components as explained in the following detailed description of the illustrative and preferred embodiments of the invention. Such description refers to the annexed drawings presenting such embodiments, and wherein:

FIGURE 1 is a vertical cross-sectional view of a complete filter system constructed in accordance with the present invention;

FIGURE 2 is a plan view of the system shown in FIGURE 1, FIGURE 2 being partially broken away to display the relative elevation of various components;

FIGURE 3 is a fragmental detailed view showing the preferred construction of filter elements incorporated in the overall system presented in FIGURES 1 and 2;

FIGURE 4 is a fragmental detailed enlarged cross-sectional view of one of the filter elements shown in FIGURE 3;

FIGURE 5 is an enlarged cross-sectional fragmental view taken on the line 5—5 of FIGURE 3 and presenting one of the filter elements as the same would appear when connected with a drain outlet as shown in FIGURE 3;

FIGURE 6 is a vertical cross-sectional view taken on the line 6—6 of FIGURE 2 and displays the so-called pump room section of a filter system constructed in accordance with the present invention;

FIGURE 7 is a cross-sectional view taken on the line 7—7 of FIGURE 1, and presents the filter chamber section of a system constructed in accordance with the present invention and particularly the preferred configuration of the face of a filter element used therein;

FIGURE 8 is a fragmental detailed schematic view showing the manner in which certain valves of the system are adjusted to provide for initial depositing of particulate material by circulation of fluid through the filter chamber;

FIGURE 9 is a fragmental detailed schematic view similar to FIGURE 8, but presenting the valves of FIGURE 8 in the position which they would occupy when the system is being operated normally to filter contaminated fluid;

FIGURE 10 is a cross-sectional view of the preferred form of slurry chamber provided by the present invention. FIGURE 10 having been taken on the line 10—10 of FIGURE 7, and showing the slurry chamber when filled with liquid;

FIGURE 11 is a cross-sectional view, like FIGURE 10, of the slurry forming chamber; however, FIGURE 11 presents the same when the liquid level therein has reached its minimum;

FIGURE 12 is a fragmental detailed view presenting the left-lower corner of the filter chamber as shown in FIGURE 7, and the flow path therein during initial circulation for the depositing of particulate material; and FIGURE 13 is a fragmental detailed view, like FIGURE 12, but FIGURE 13 presents the flow path of fluid during normal operation of the system.

A. *General primary system operation and construction*

In order to facilitate understanding of the improvements in operating methods, and the improvements in apparatus, provided by the present invention, attention will first be directed to the overall operation of the filter system presented in the annexed drawing. By reference to FIGURE 1, it will be noted that the overall system 2 is submerged below the ground level 4 in its entirety. The system includes a filter tank or chamber 6 and a pump room tank or chamber 8. The pump room chamber 8 is separated from the filter chamber 6 entirely by an intermediate wall 10 extending generally centrally and vertically across the overall apparatus.

Extending within the pump room 8 are an outlet pipe 12, an inlet pipe 14, a scum removal pipe 16 and a cleaning pipe 18. Pipes, or conduits, 12, 14, 16 and 18 pass through suitable seals 12(s), 14(s), 16(s), and 18(s) of any well-known type in the right wall 20 of the pump room chamber 8. The pipe or conduit 12 passes to one inlet of a valve 24, of standard construction, which as explained below, serves to provide for recirculation of fluid within the filter chamber 6, or during normal operation, output of fluid from the filter chamber.

The inlet pipe or conduit 14 has a valve 26 therein, and this valve serves to maintain, or alternately disconnect communication of the conduit 14 with the interior of the filter chamber 6. The conduit 16 is an alternative inlet conduit to the conduit 14, and this conduit is also provided with a valve 28 which for all practical purposes is identical with the valve 26. The conduit 16 is provided so that scum may be drained from the pool, and this conduit may be at any suitable level depending upon the water level of the pool. Moreover, it will be understood that this conduit can be suitably connected with a flow control means so as to drain scum through the conduit regardless of its level.

The conduit 18 has a valve 30 therein which serves to connect or disconnect the conduit 18 from an outlet drain box 32 whereby the filter chamber can be completely emptied if desired.

By referring to FIGURE 7, it will be seen that inlet conduit 14 enters chamber 6 to one side of the filter elements exposed therein. These filter elements are generally designated by the numeral 50 and are presented in some detail in FIGURES 3, 4 and 5. Fluid which enters the chamber 6 via the conduit 14, as schematically shown in FIGURE 9, passes from conduit 14 through the filter elements 50, and then, as shown in FIGURE 3, downwardly through the filter elements into a filter chamber outlet conduit generally designated by the numeral 52. As shown in FIGURE 2, the filter elements are communitively connected with the conduit 52 in staggering relation, i.e. the right end filter element 50 as shown in FIGURE 2 is connected with the conduit 52 slightly below the longitudinal center thereof whereas the next filter element 50 is connected with the outlet conduit 52 slightly above the longitudinal center thereof. This offset connection relationship has been found to provide for efficient results.

Now, if reference is again made to FIGURE 1, it will be noted that the fluid which is passed through the filter elements enters a pump inlet conduit 54 which communicates at one end with the outlet conduit 52 from the filter chamber, and which communicates at the other end with a pump chamber 56 of conventional design having a pump impeller therein. The impeller, as also conventional, is driven by a suitable motor 58. Fluid which passes into the pump chamber 56 is caused to flow through the pump outlet conduit 60 to the valve 24 disposed in alignment with, and communicating with the outlet conduit 12. If the valve 24 is set in the position presented in FIGURE 8, fluid entering the pump chamber will pass through the conduit 60, the valve 24 or rotatable valve body 25 therein, and then outwardly through a downwardly directed discharge nozzle 70. The nozzle 70, and direction thereof will be best seen by reference to FIGURE 1.

If the rotatable valve member body 25 is adjusted from the position shown in FIGURE 8 to the position shown in FIGURE 9, then any fluid entering the pump chamber 56 will pass through the pump outlet conduit 60, the valve 24, and out through the outlet conduit 12. Thus, the valve 24 which is operated by a standard stem 72 in well-known manner, serves to control the fluid path of liquid leaving the filter chamber 6. Either fluid therein which has passed through the filter elements 50, the filter outlet conduit 52, the pump conduit 54, the pump chamber 56, and the pump outlet conduit 60 will flow back into chamber 6, or alternatively, out of the system.

If reference is again made to FIGURES 2 and 7, it will be noted, as suggested above, that the inlet conduit 14 leading through valve 26 to the filter chamber 6 enters the filter chamber to one side of the filter elements disposed therein. Separating that part of chamber 6 where the conduit 14 enters, from that part of chamber 6 containing the filter elements is a baffle plate 80 having elongated vertical openings 90 at either end thereof as shown in FIGURE 1. The baffle plate 80 is supported in position by means of suitable brackets 82 which cooperate with the projecting flanges 84, 84', 86, 86' defining the top and bottom edges of the openings 90. By virtue of the provision of the baffle plate with openings at either end thereof, fluid which enters the chamber 6 passes to the section of that chamber housing the filter elements through the openings 90 and converges centrally while filling the chamber. Any fluid introduced in the chamber which is to be drained, as explained above, must pass through the filter elements and the filter element outlet conduit 52 to the pump chamber 56.

Although not specifically pointed out hereinabove, by reference to the drawings it will be seen that the pump room section 8 and filter chamber section 6 of the overall filtering apparatus 2 are provided with suitable removable covers 3 and 5, respectively, which permit access to the separate systems sections. Moreover, to facilitate maintenance of the pump room section 8 there is provided therein, as conventional, a ladder 7 which is vertically disposed between an upper platform 9 and a lower platform 11 (FIGURE 2).

The filter chamber section 6 of the unit, as best shown in FIGURE 7, has a bottom wall or pan 6(b) which converges downwardly in spaced relation to the filter outlet conduit 52. The converging central portion of the pan 6(b) empties into the outlet drain box 32 referred to hereinabove. The filter elements 50 are supported above this pan by virtue of their coupling between filter outlet conduit 52, and the top supports 15 and 17 which extend across the filter chamber 6 as shown in FIGURES 1, 2, and 7.

These details of the system referred to hereinabove are incorporated in the preferred form of system used in accordance with the invention but it will be understood, as pointed out above that the invention may be used with various types of apparatus other than that specifically presented in the annexed drawings.

Regardless of the type of apparatus used, the operation would follow the general steps referred to below.

B. *Initial filling and coating operation*

Now, initially, when it is desired to fill the filter chamber 6, the valve 26 is opened and fluid is drained through the conduit 14 and valve 26 into the chamber 6 and allowed to fill the same. After the chamber 6 has been initially filled, the valve 26 is closed and the valve 24 is adjusted to the position shown in FIGURE 8. Of course, during this same time the valves 28 and 30 are closed so that no fluid is allowed to drain from the chamber 6.

After the chamber 6 has been filled and the valve 24 has been adjusted to the position shown in FIGURE 8, then the motor 58 is turned on, and fluid within the chamber 6 is caused to circulate therethrough. During this time, particulate material is added to chamber 6 in bulk at a point near elbow 70—between chamber 100 and plate 80. Having particulate material within the fluid causes deposition. As the material passes through the filter element, larger particles of the particulate are retained on the element surface while smaller particle sizes pass through and subsequently are retained on the precoated element by this process of recycling.

This circulation is continued until the liquid in chamber 6 runs clear with no particulate remaining in suspension. The particulate in accordance with the preferred embodiment of the invention comprises diatomaceous earth.

Filter elements will be coated evenly since the particulate in chamber 6 will have been evenly dispersed through the churning action of the recycle line 70 into stilling area between side wall of tank and plate 80. Hydraulic effect over the element surface will shift the particulate evenly to give uniform depth of coating.

Once the chamber has been filled and circulation has progressed whereby all of the filter elements are provided with a suitable coating of particulate material, then the valve 24 is adjusted to the position shown in FIGURE 9, and the valve 26 is opened. This allows fluid to be filtered to enter the chamber 6, pass through the filter elements 50 in the manner described, pass out of the chamber 6 through the filter chamber outlet conduit 52, and to and through the pump chamber 56 to the valve 24 where it is diverted into the outlet conduit 12. In other words, during normal operation the fluid passes into the conduit 14, into the filter chamber, through the filter elements, through the pump and then out through the conduit 12. Naturally, during this normal operation, contamination is absorbed and deposited on the surface of the filter elements 50. Thus, after a relatively short period of operation the filter system tends to become inefficient, unless further steps are taken to maintain efficiency.

C. *Maintaining efficient operation*

It has been found that the efficiency can be increased if a further supply of particulate material, or in this instance diatomaceous earth, is added to the circulating liquid periodically whereby the same is deposited during the circulation on the surface of the filter elements. Now, the primary features of the present invention reside in the manner in which the additional particulate material is supplied to the circulating fluid. As explained at the outset of the present specification, the idea of circulating liquid to deposit the material initially and the idea of adding additional particulate material during operation to provide for increased efficiency are not basic aspects of the present invention, and the present invention resides in the manner in which particulate material is added to the circulating liquid in a system such as that described in some detail hereinabove.

The invention provides, in a method of filtering contaminated fluid including the steps of (1) passing the same through a filter chamber having filter elements therein adapted to support particulate material on the surfaces thereof, and (2) adding particulate material periodically to fluid being filtered to deposit new particulate material on the elements, the improvement comprising the steps of (a) storing additional particulate material at separate vertical levels on opposite sides of a constricted fluid path within a separate chamber, (b) passing fluid through such path and over and about the stored particulate material to form a slurry, (c) draining the slurry through the path and from separate chamber passed the levels while settling the particulate material in the slurry on the separate levels whereby the drained slurry has a controllable concentration of particulate material, and (d) intermittently repeating steps (b) and (c) above. The preferred embodiments of the invention, as also suggested above, provide for carrying on the intermittent repetition in response to the level of liquid within the separate chamber.

The preferred manner in which the aforesaid steps are performed, and the apparatus provided by the invention for carrying out such steps are explained in more detail hereinbelow.

D. *Method of, and apparatus for forming and adding slurry*

The invention also provides, in addition to the improved method of operation, a preferred form of apparatus for carrying out the method of the invention. However, it is to be understood that while the apparatus to be described in the immediately following paragraphs is the preferred apparatus embodiment of the invention, and an improvement in and of itself, the method may be practiced with other forms of apparatus without departing from the scope and spirit of the present invention.

As shown in FIGURES 1, 2 and 7, within the filter chamber 6 and supported in one corner thereof, is a separate tank generally designated by the numeral 100. The construction of this tank 100 is best presented in FIGURES 10 and 11. By referring to those figures, it will be noted that the tank has an open top 102 and inwardly tapering bottom wall portions 104 and 106 which merge contiguously into a planar bottom wall surface 108. The tank is of generally rectangular overall configuration, but for the reasons explained below, preferably has the tapering bottom wall. Disposed centrally on the longitudinal axis of the tank and projecting slightly above the bottom wall is a spray inlet head 110 which is fed by a suitable inlet conduit 112. In the end wall of the tank, and spaced vertically above the spray inlet head 110 is a drain outlet 114. Disposed vertically above the drain outlet 114 are a plurality of horizontally disposed baffle plates 116, 116′, 118, 118′, 120 and 120′. These baffle plates project inwardly from, and are suitably supported by, the end walls of the chamber 100 and define an open fluid path aligned vertically with the spray head 110 and the drain opening 114. The uppermost baffle plates 116, 116′ are narrower than the next adjacent baffle plates 118, 118′, and the baffle plates 118, 118′ are narrower than the lowermost baffle plates 120 and 120′. The inner edges of the baffle plate thus define a restricted or converging fluid path. Such path converges or tapers in the direction of the spray head 110 or drain opening 114. The baffle plates 116–120′, inclusive, are vertically spaced apart and are adapted to support particulate material, preferably diatomaceous earth, on the surfaces thereof.

The chamber 100 and the components associated therewith described above serve as means for forming a slurry within the chamber 100, which slurry can be drained through the opening 114 into the primary filter chamber 6 so as to mix with the fluid traveling through such chamber. The particulate material so mixed is deposited on the surface of the filter elements 50 as the fluid passes therethrough.

Assume, for purposes of understanding the method of operation, initially that fluid is entering the chamber 100 through the spray head 110. This fluid begins to fill the chamber and is somewhat turbulent. As the chamber fills the turbulence decreases by virtue of the water pressures on the outlet openings of the spray head 110; however, there is some turbulence maintained as the chamber fills with fluid to the level shown in FIGURE 10. Prior to the filling, particulate material has been deposited on the baffle plates in the manner shown. As the chamber fills, simultaneously some of the fluid therein drains through the opening 114 and flows into the filter chamber 6. Some of the draining fluid contains particulate material which has been dispersed therein by virtue of the turbulence within the chamber 100, by virtue of the suction created adjacent the particulate material on the bottom wall of the chamber when fluid is introduced into the spray head 110, and by virtue of circulation of the fluid within the chamber adjacent the baffle plates 116–120′. Fluid is drained from the chamber 100 at a slower rate than it is introduced, and it is for this reason that the chamber fills to the level shown in FIGURE 10.

After the chamber has filled to such level, then the supply of fluid to the chamber is cut off, and fluid is allowed to drain therefrom. The draining fluid passes through the constricted fluid path defined between the inner edges of the baffles and as it passes thereby, some particulate material in the fluid is settled onto the baffle plates 116–120′ inclusive. Initially, of course, the fluid flowed in and about the baffle plates and during its flow picked up particulate material. During the draining operation, however, a substantial part of the particulate material settles from the fluid because the turbulence is cut out due to the shut-off of inlet conduit 112 and all fluid above the lowermost baffle must pass by the baffles thereby depositing at each stage some particulate material. Naturally, the fluid exists or drains from the chamber 100 through the opening 114 with some particulate material therein, but due to the settling and constricted flow of the fluid during the draining operation, there is no over concentration of particulate material. After the draining has been completed, and the water level has reached the level shown in FIGURE 11, i.e. immediately below or adjacent the drain opening 114, then the operation referred to hereinabove is repeated.

For purposes of causing repetition of the slurry forming operation intermittently, there is provided a float 133 which is reciprocal on a shaft 122 supported between an upper bracket member 124 and a lower bracket member 126 within the chamber 100. The float 133 cooperates at its right peripheral edge, as shown, with an upper switch member or contact 130, and at the lower extremity of its travel with a lower switch member or contact 136.

A suitable electrical circuit, of any conventional type is incorporated having the switches or switch contacts 134 and 136 therein, and this circuit also includes a valve 150 having an electromagnetic operating device 152 coupled therewith. When the float 133 is in the position shown in FIGURE 10, then it engages the switch contact 130 and operates the device 152 whereby the same shuts off the supply of liquid to the tank 100. More specifically, when the float is in the position shown in FIGURE 10, the switch 130 operates the magnetic device 152, whereby the valve 150 is closed and no fluid can flow to chamber 100. This condition remains, i.e. no flow, until the liquid level within the tank 100 decreases to the position shown in FIGURE 11. At this time, the float 133 activates the switch contact 136, and in turn the electromagnetic device 152 opens the valve 150 whereby fluid is again passed through the conduit 112 and spray head 110 into the tank or chamber 100. The condition of flow continues until the tank is filled as shown in FIGURE 10, and then the supply is again cut off. Thus, intermittent operation is provided, and during each operation there is a period when there is no supply of fluid to the chamber 100 and fluid is allowed to drain therefrom.

It should be understood that switch contacts 134 and 136 may be operated independently of a float contact device in conjunction with a resistance amplifier which employs high and low level electrodes to open and close the circuit which activates magnetic device 152.

E. Conclusion

From the foregoing discussion, it will be understood that with the intermittent operation described, with each filling a slurry is formed in chamber 100, and with each draining particulate material is settled from the slurry. In a sense, there is an overconcentrated slurry formed each time in chamber 100, above the baffle 120, and the overconcentrated slurry is effectively reduced in concentration by virtue of the settling caused by flow of the fluid over and adjacent the baffles during the draining operation. The invention thus makes use of the inherent settling properties of the material, which preferably, as suggested above, is diatomaceous earth. Naturally, not all fluid introduced within the chamber 100 passes up above the lower baffle 120. Fluid which does not pass above the lower baffle 120, however, has a certain amount of particulate material dispersed therein by virtue of the fact the particulate material settles to the bottom of the chamber 100 during each operation as well as settling on the baffles 116–120′ inclusive. The particulate material in the bottom of the chamber, as explained previously, is dispersed in incoming liquid due to the turbulence and fluid streams created when new or fresh liquid is introduced into the chamber 100.

The invention relies on the very nature of the particulate material and the specific gravity thereof which causes certain settling. Due to the settling feature of the particulate material and the size of the drain opening 114, the bulk of the particulate material settles out on the baffle plates above the drain orifice. Thus, at no one time is any over concentration of slurry drained from the chamber 100, and with a system constructed and used in accordance with the present invention, there is a continued and extended time of operation by virtue of the uniform slurries added from operation to operation.

Although no particular reference has been made to the connection of slurry tank inlet conduit 112 hereinabove, in the system shown in FIGURE 1, the inlet conduit 112 is coupled with the pump outlet conduit 60 whereby the inlet conduit 112 is effectively a bleed-off from the pump chamber 56. While this construction is preferred, it is to be understood that the fluid introduced into the slurry chamber 100 may come from any suitable source independent of the system of the invention if desired, without departing from the scope and spirit of the invention provided hereby.

After reading the foregoing detailed description, it should be apparent that the objects set forth in the outset of this specification have been successfully achieved. It should also be apparent that various modifications can be made to the embodiments of the invention presented, other than those specifically set forth, while still embodying the particular principles of the invention.

Accordingly, what is claimed is:

1. In a filter system including a filter chamber, a plurality of filter elements disposed in said chamber for supporting particulate material on the surfaces thereof, means for feeding contaminated liquid to said chamber, means for withdrawing filtered fluid from said chamber after said fluid has passed through said filter elements and means for feeding particulate material in said filter chamber: the improvement in the last-mentioned means comprising a particulate material chamber separate from said filter chamber, drain means communicating said particulate material chamber with said filter chamber, means for delivering fluid to said particulate material chamber, a plurality of vertically spaced baffle means horizontally disposed within said particulate material chamber above said drain means and said fluid delivery means, said baffle means including a vertically extending fluid passageway therethrough and said baffle means supporting particulate material on opposite sides of said fluid passageway within said material chamber.

2. The combination defined in claim 1 wherein said means for delivering fluid to said material chamber includes a spray head within said chamber.

3. The combination defined in claim 2 wherein said particulate material chamber has convergently tapering bottom wall panels terminating adjacent said spray head, wherein said drain means comprises a drain opening in said particulate material chamber spaced vertically above said spray head, and wherein the lowest of said baffles are vertically spaced above said drain opening.

4. The combination defined in claim 1 wherein said baffle means comprises a plurality of horizontally disposed vertically progressively narrower plates defining a tapered fluid path converging vertically inwardly in the direction of said drain.

5. The combination defined in claim 4 wherein said means for withdrawing filtered fluid from said filter chamber comprises pump means, wherein said means for introducing fluid within said material chamber includes a conduit in fluid communication with said pump means and having a valve therein, and wherein said combination further includes means sensitive to the level of liquid within said particulate material chamber for opening and closing said valve.

References Cited by the Examiner

UNITED STATES PATENTS

| | | | |
|---|---|---|---|
| 2,210,719 | 8/40 | Hodges | 210—193 X |
| 2,455,130 | 11/48 | Lomax | 210—193 X |
| 2,878,969 | 3/59 | Griswold | 222—133 |
| 2,952,363 | 9/60 | Griswold | 210—193 |

REUBEN FRIEDMAN, *Primary Examiner.*

HERBERT L. MARTIN, *Examiner.*